United States Patent [19]

Suzuki et al.

[11] Patent Number: 4,791,366
[45] Date of Patent: Dec. 13, 1988

[54] APPARATUS INCLUDING A PAIR OF ANGULARLY SPACED SENSORS FOR DETECTING ANGLE OF ROTATION OF A ROTARY MEMBER

[75] Inventors: Tokio Suzuki; Tsutomu Sato, both of Iwaki, Japan

[73] Assignee: Alpine Electronics Inc., Japan

[21] Appl. No.: 923,300

[22] Filed: Oct. 27, 1986

[30] Foreign Application Priority Data

Oct. 31, 1985 [JP] Japan .................................. 168333[U]

[51] Int. Cl.$^4$ .......................... G01B 7/30; G01B 33/06
[52] U.S. Cl. ...................................... 324/208; 324/252
[58] Field of Search ............... 324/207, 208, 160, 163, 324/165, 173–175, 252; 318/653; 340/670–672, 686; 123/414, 617

[56] References Cited

U.S. PATENT DOCUMENTS

| | | | |
|---|---|---|---|
| 4,181,884 | 1/1980 | Shirasaki et al. | 324/208 |
| 4,369,405 | 1/1983 | Sato et al. | 324/174 |
| 4,466,189 | 8/1984 | Tobin | 33/267 |
| 4,490,674 | 12/1984 | Ito | 324/208 |
| 4,495,464 | 1/1985 | Kozai et al. | 324/174 |

FOREIGN PATENT DOCUMENTS

| | | | |
|---|---|---|---|
| 0063763 | 5/1980 | Japan | 324/165 |
| 0220816 | 11/1985 | Japan | 324/208 |

*Primary Examiner*—Gerard R. Strecker
*Attorney, Agent, or Firm*—Guy W. Shoup; Leighton K. Chong

[57] ABSTRACT

An apparatus for detecting an angle of rotation is disclosed which comprises a rotary magnet having four poles, two magnetic sensors of a ferromagnetic material disposed over the periphery of the rotary magnet so as to face the magnetic poles of the rotary magnet and to have a phase difference of $3\pi/8$ therebetween, a signal generating portion for applying the magnetic sensors of a ferromagnetic material with a first and a second sinewave signals having a phase difference of $\pi/2$ in electrical angle therebetween, a synthesizing portion for synthesizing signals output from both of first magnetic sensor of a ferromagnetic material and second magnetic sensor of a ferromagnetic material thereby to output a synthesized signal with a phase difference corresponding to an angle of rotation $\theta$ from the first sine-wave signal, and a rotational angle detecting portion for detecting the angle of rotation based on the phase difference.

3 Claims, 3 Drawing Sheets

APPARATUS INCLUDING A PAIR OF ANGULARLY SPACED SENSORS FOR DETECTING ANGLE OF ROTATION OF A ROTARY MEMBER

BACKGROUND OF THE INVENTION

1. Field of the Invention

The present invention relates to an apparatus for detecting an angle of rotation and more particularly to an apparatus for detecting an angle of rotation employing magnetic sensors of a ferromagnetic material to detect an angle of rotation in a digital manner.

2. Description of the Prior Art

There is an apparatus for detecting an angle of rotation of a rotary member employing magnetic sensors of a ferromagnetic material. The ferromagnetic magnetic sensor utilizes magnetoresistance effect of a ferromagnetic metal, namely, the property of the material such that its resistance value changes according to the angle formed by the direction of magnetizing force and that of electric current.

The resistance value of a ferromagnetic material becomes the maximum when the direction of the magnetizing force and that of the electric current are in parallel and becomes the minimum when they cross at right angles. Therefore, when a ferromagnetic magnetic sensor is constructed, as indicated in FIG. 5, of thin film patterns A, B of a ferromagnetic material arranged to cross at right angles and electrically connected in series and connected to a power source voltage $V_{cc}$ at both ends a, c thereof and then the thin film patterns are applied with a magnetic field which is sufficiently high to saturate the magnetization in the film patterns, and if the magnetic field is rotated through the angle $\theta$ with reference to the direction of the current through the thin film pattern A, then an output signal $V_0$ given by the formula, $$V_0 = V_{cc} \cdot K \cdot \cos 2\theta + \tfrac{1}{2} \cdot V_{cc},$$

will be delivered from the output terminal b as indicated in FIG. 6. Incidentally, FIG. 7 shows an example of the thin film patterns A, B.

FIG. 8 indicates an example of a prior art apparatus for detecting an angle of rotation employing a magnetic sensor of a ferromagnetic material arranged such that a ferromagnetic magnetic sensor DME is disposed to face the periphery, where multiple magnetic poles are provided, of a ring magnet RMG. In this case, when the distance between neighboring poles of the ring magnet RMG is represented by $\lambda$ as indicated in FIG. 9, thin film patterns A, B of the ferromagnetic magnetic sensor DME are disposed at the spacing of $\lambda/2$.

Now, if a power supply voltage $V_{cc}$ is applied between the terminals a, c (refer to FIG. 9) and a voltage $V_0$ is taken out from the terminal b, then a signal having the same number of sine waves as the number of the poles is generated for one rotation of the ring magnet RMG. Therefore, when the number of poles is represented by P, the relationship between number of pulses (sine waves in the signal) n and the angle of rotation $\theta$ is given by $$\theta = (360/P) \cdot n$$

and it becomes possible to detect the angle of rotation by counting the number of the pulses.

In the prior art apparatus for detecting an angle of rotation employing the ferromagnetic magnetic sensor, however, the number of poles had to be increased in order to improve its resolving power, and the diameter of the rotary magnet had to be enlarged in order to increase the number of poles, and the apparatus had to be made n a large form. In other words, there was a problem in the prior art that it was impossible to provide an apparatus for detecting an angle of rotation with a high resolving power in a small form.

SUMMARY OF THE INVENTION

Accordingly, a primary object of the present invention is to provide an apparatus for detecting an angle of rotation made in a smaller form but having an improved resolving power and capable of detecting the angle of rotation with high precision unaffected by changes in temperature.

FIG. 1 is a schematic explanatory diagram of the present invention.

Referring to the drawing, reference numeral 11 denotes a rotary magnet having four poles, reference numerals 12, 13 denote ferromagnetic magnetic sensors disposed over the periphery of the rotary magnet 11 so as to face the magnetic poles thereon and kept apart at an angular spacing of $(2n+1)\pi/8$, reference numeral 14 denotes a signal generating portion applying a sine-wave signal SW and a cosine-wave signal CW to first and second ferromagnetic magnetic sensors 12, 13, reference numeral 15 denotes a synthesizing portion for synthesizing signals $V_{s1}$, $V_{s2}$ output from the first and second ferromagnetic magnetic sensors 12, 13, respectively, thereby to output a signal $V_c$ with a phase difference $\psi$ from the phase of the sine wave signal SW corresponding to the angle of rotation $\theta$, and each of $B_1$ and $B_2$ reference numeral 16 denotes a rotational angle detecting portion for detecting the phase difference $\psi$ to output the angle of rotation $\theta$.

Over the circumference of a rotary magnet 11 having four poles, there are disposed two ferromagnetic magnetic sensors 12, 13 so as to face the magnetic poles of the rotary magnet 11 and kept apart at an angular spacing of $\theta_s(2n+1)\pi/8$, and voltages $E_1$ and $E_2$ are applied to the first and second ferromagnetic magnetic sensors 12, 13, respectively. Then, a signal $V_{s1}$ given by the formula $$\begin{aligned} V_{s1} &= E_1 \cdot \alpha \cdot \sin 4\theta + \tfrac{1}{2} \cdot E_1 + \beta_1 \cdot E_1 \\ &= E_1(\alpha \cdot \sin 4\theta + \tfrac{1}{2} + \beta_1) \end{aligned} \quad (1)$$

is output from the first ferromagnetic magnetic sensor 12 and a signal $V_{s2}$ given by the formula $$\begin{aligned} V_{s2} &= E_2 \cdot \alpha \cdot \cos 4\theta + \tfrac{1}{2} \cdot E_2 + \beta_2 \cdot E_2 \\ &= E_2(\alpha \cdot \cos 4\theta + \tfrac{1}{2} + \beta_2) \end{aligned} \quad (2)$$

is output from the second ferromagnetic magnetic sensor 13. In the above, $\alpha$ represents the sensitivity of the ferromagnetic sensor, and each of $\beta_1$ and $\beta_2$ represents a deviation the intermediate potential of the sensor. Therefore, if first and second sine-wave signals CW, SW to be given by $$E_1 = E \cdot \cos \omega t \quad (3)$$

$$E_2 = E \cdot \sin \omega t \quad (4)$$

are applied to the ferromagnetic magnetic sensors 12, 13, respectively, as $E_1$, $E_2$ in the formulas (1), (2), then signals $V_{s1}'$, $V_{s2}'$ to be given by $$V_{s1}' = E \cdot \alpha \cdot \sin 4\theta \cdot \cos \omega t$$

$$V_{s2}' = E \cdot \alpha \cdot \cos 4\theta \cdot \sin \omega t$$

are obtained (direct current portions are omitted for convenience' sake of explanation).

If these signal $V_{s1}'$ and $V_{s2}'$ are synthesized in the synthesizing portion 15, then a signal $V_c$ with a phase difference from the phase of the sine-wave signal SW of $\psi (=(4\theta-\pi)/\omega)$ corresponding to the angle of rotation $\theta$ as given by $$\begin{aligned} V_c &= V_{s1}' - V_{s2}' \\ &= E \cdot \alpha \cdot \sin(4\theta - \omega t) \\ &= E \cdot \alpha \cdot \sin(\omega t - 4\theta + \pi) \\ &= E \cdot \alpha \cdot \sin \omega[t - (4\theta - \pi)/\omega] \end{aligned}$$

is output therefrom. Therefore, by detecting the phase difference by means of the rotational angle detecting portion 16, through, for example, counting the time clock pulses $P_c$ corresponding to the phase difference and subtracting the constant corresponding to $\pi/\omega$ therefrom, the angle of rotation $\theta$ can be obtained.

DESCRIPTION OF THE PREFERRED EMBODIMENT

Figure 1:
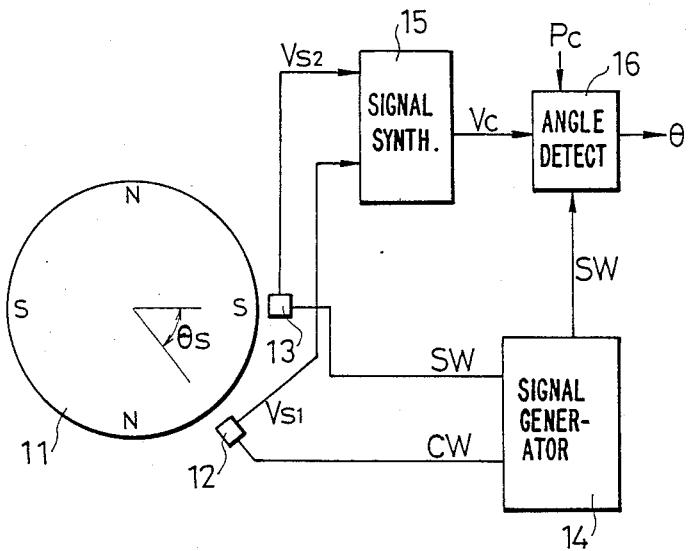
FIG. 1 is an explanatory schematic diagram of the present invention.
Figure 3:
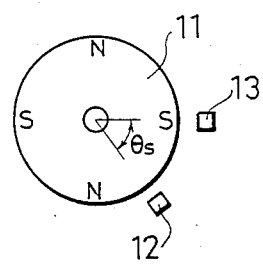
FIG. 3 is a drawing indicating positional relation between a rotary magnet and ferromagnetic magnetic sensors of the invention.
Figure 4:
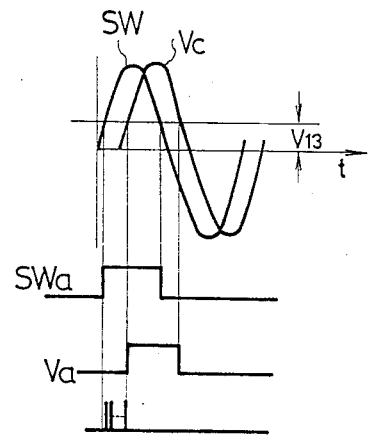
FIG. 4 is a waveform chart for explaining operation of the apparatus in FIG. 2.
Figure 2:
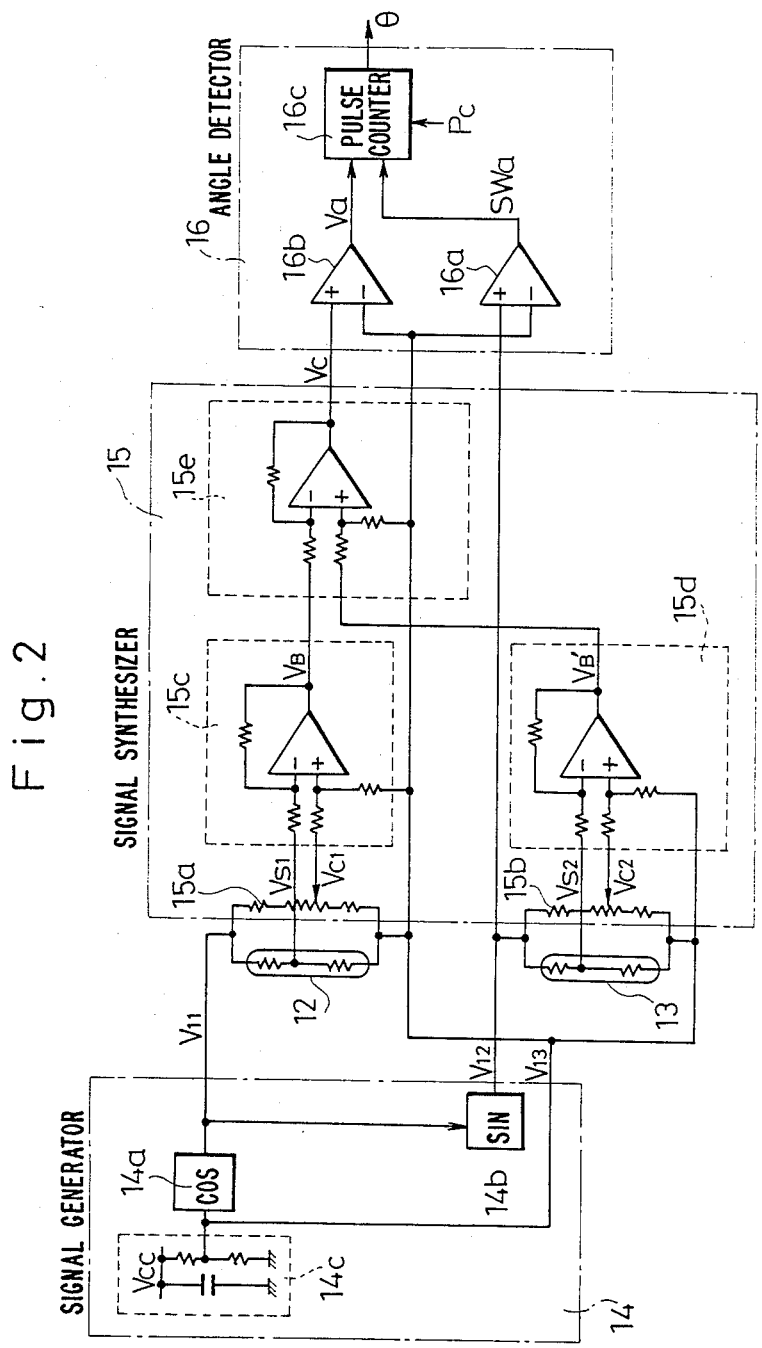
FIG. 2 is a circuit block diagram of the apparatus for detecting angle of rotation of the present invention.
Figure 5:
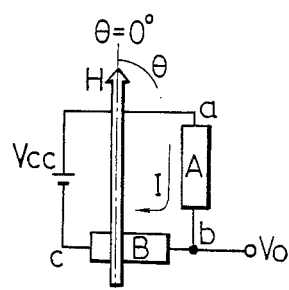
FIGS. 5 to 7 are explanatory drawings of operation of the ferromagnetic magnetic sensor.
Figure 6:
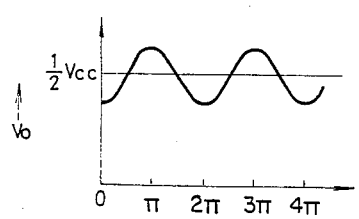
Figure 7:
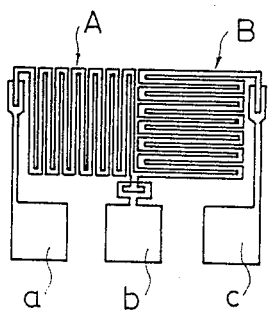
Figure 8:
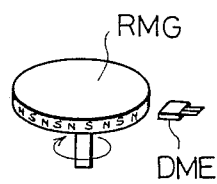
FIGS. 8 and 9 are explanatory drawings of an apparatus for detecting angle of rotation of the prior art.
Figure 9:
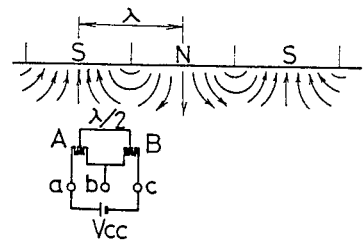

FIG. 2 is a circuit block diagram of the apparatus for detecting angle of rotation of the present invention, FIG. 3 is a drawing indicating positional relation between ferromagnetic magnetic sensors and a rotary magnet, and FIG. 4 is a waveform chart for explaining operation of the apparatus in FIG. 2.

Reference numeral 11 (FIG. 3) denotes a rotary magnet having four poles and 12, 13 denote a first and a second ferromagnetic magnetic sensor disposed over the periphery of the rotary magnet 11 so as to face its poles and kept apart at an angular spacing of $(2n+1)\pi/8$ each thereof being structured as described with reference to FIGS. 4 to 7. For the angular spacing, n is any integer, and the spacing is selected in the following example to be $3\pi/8$.

In FIG. 2, reference numeral 14 denotes a signal generating portion for applying the first and second ferromagnetic magnetic sensors 12, 13 with a cosine-wave signal CW ($=V_{11}$) and a sine-wae signal SW ($=V_{12}$), respectively, as indicated by $$V_{11} = E \cdot \cos \omega t + V_{13} \quad (3')$$

$$V_{12} = E \cdot \sin \omega t + V_{13} \quad (4')$$

and the same has a cosine-wave signal generating circuit 14a, a sine-wave signal generating circuit 14b, and a direct current voltage generating portion 14c for generating a d.c. voltage $V_{13} (= V_{cc}/2)$.

Reference numeral 15 denotes a synthesizing portion for synthesizing signals $V_{s1}$, $V_{s2}$ which are output from the ferromagnetic magnetic sensors 12, 13, respectively, thereby to output a signal $V_c$ with a phase difference from the phase of the sine wave signal SW corresponding to the angle of rotation $\theta$, and the same has resistor portions 15a, 15b for outputting signals $V_{c1}$, $V_{c2}$ indicated by $$V_{c1} = E \cdot \cos \omega t \cdot (\tfrac{1}{2} + \beta_1) + V_{cc}/2 \quad (5)$$

$$V_{c2} = E \cdot \sin \omega t \cdot (\tfrac{1}{2} + \beta_2) + V_{cc}/2 \quad (6)$$

differential amplifiers 15c, 15d for outputting, respectively, differentials $V_B$, $V_B'$ between $V_{s1}$ and $V_{c1}$ and $V_{s2}$ and $V_{c2}$, and a differential amplifier 15e for synthesizing the difference between $V_B$ and $V_B'$ thereby to output a synthesized signal $V_c$. In the above, each of $\beta_1$ and $\beta_2$ represents a deviation at the intermediate potential.

Reference numeral 16 denotes a rotational angle detecting portion for detecting $\psi (=(4\theta - \pi)/\omega)$ thereby to output the angle of rotation $\theta$. This rotational angle detecting portion has a waveform shaper 16a for slicing the sine-wave signal $V_{12}$ at a predetermined slice level $V_{13}(=V_{cc}/2)$ thereby to output a rectangular wave signal SWa, a waveform shaper 16b for slicing the synthesized signal $V_c$ output from the differential amplifier 15e at the slice level $V_{13}$ thereby to output a rectangular wave signal Va, and an arithmetic logical unit 16c for counting time clock pulses $P_c$ corresponding to the phase difference between the signal SWa and the signal Va and subtracting a constant corresponding to $\pi/\omega$ from the count value thereby to generate the angle of rotation $\theta$.

The shaft of the rotary magnet 11 is attached to a rotating member (not shown) and the cosine-wave signal $V_{11}$ and the sine-wave signal $V_{12}$ indicated by the formulas (3') and (4') are output from the cosine-wave signal generating circuit 14a and the sine-wave signal generaing circuit 14b, respectively. And thereby, the cosine and sine signals $E_1$, $E_2$ indicated by the formulas (3), (4) are applied to the ferromagnetic magnetic sensors 12, 13, respectively, and thus, the signal $V_{s1}$ indicated by the formula (1) is output from the first ferromagnetic magnetic sensor 12 and the signal $V_{s2}$ indicated by the formula (2) is output from the second ferromagnetic magnetic sensor 13 with the rotation of the rotating member.

Incidentally, the reason why cos $4\theta$ is output, when a signal corresponding to sin $4\theta$ is output from one of the ferromagnetic magnetic sensors, from the other ferromagnetic magnetic sensor is that, if, generally, the number of poles is put to be N and the angle $\theta_s$ formed by the two ferromagnetic magnetic sensors is given by $$\theta_s = (\pi/2 + n\pi)/N$$

then, when sin $4\theta$ is generated by one, $$\sin N[\theta + (\pi/2 + n\pi)/N]$$
$$= \sin(N\theta + (2n + 1)\pi/2)$$
$$= \cos N\theta$$

is generated from the other, and thus, by making N=4, it follows that $\cos 4\theta$ is generated from the other when $\sin 4\theta$ is generated from the one.

Meanwhile, the signals $V_{c1}$, $V_{c2}$ indicated by the formulas (5), (6) are output from the resistor portions 15a, 15b, respectively, of the synthesizing portion 15, and so, from the differential amplifiers 15c, 15d are output signals $V_B$, $V_B'$ given by $$V_B = (V_{s1} - V_{c1}) \cdot k_B + V_{13} \quad (7)$$
$$= k_B \cdot \alpha \cdot E \cdot \sin 4\theta \cdot \cos \omega t + V_{cc}/2$$

$$V_B' = (V_{s2} - V_{c2}) \cdot k_B + V_{13} \quad (8)$$
$$= k_B \cdot \alpha \cdot E \cdot \cos 4\theta \cdot \sin \omega t + V_{cc}/2.$$

Incidentally, in the formulas (7)—(8), $k_B$ represents the gain of the differential amplifiers 15c, 15d.

Subtraction between these signals $V_B$, $V_B'$ and amplification thereof are made in the differential amplifier 15e and a signal $V_c$ given by $$V_c = (V_B - V_B') \cdot k_c + V_{13} \quad (9)$$
$$= k_B k_c \alpha E(\sin 4\theta \cdot \cos \omega t - \cos 4\theta \cdot \sin \omega t) + V_{cc}/2$$
$$= k_B k_c \alpha E \cdot \sin(4\theta - \omega t) + V_{cc}/2$$
$$= k_B k_c \alpha E \cdot \sin(\omega t - 4\theta + \pi) + V_{cc}/2$$
$$= k_B k_c \alpha E \cdot \sin \omega [t - (4\theta - \pi)/\omega] + V_{cc}/2$$

is output from the differential amplifier, that is, the signal $V_c$ with the phase difference $$\psi = (4\theta - \pi)/\omega$$

corresponding to the angle of rotation $\theta$ from the sine-wave signal SW $V_{12}$ is output therefrom. Incidentally, $k_c$ in the formula (9) is the gain of the differential amplifier 15e.

The waveform shaper 16a slices the sine-wave signal $V_{12}$ at the predetermined slice level of $V_{13}$ ($=V_{cc}/2$) and inputs the rectangular wave signal SWa to the arithmetic logical unit 16c and the waveform shaper 16b slices the synthesized signal $V_c$ output from the differential amplifier 15e at the slice level of $V_{13}$ and inputs the rectangular wave signal $V_a$ to the arithmetic logical unit 16c. The arithmetic logical unit 16c counts the clock pulses during the period of time correspoonding to the phase difference between the signal SWa and the signal Va, namely, $(4\theta - \pi)/\omega$, and subtracts therefrom a constant corresponding to $\pi/\omega$ thereby to generate the angle of rotation $\theta$.

Although, $V_B - V_B'$ has been computed in the differential amplifier 15e in the above description, $V_B + V_B'$ may be computed instead. And, the case where $\cos \omega t$, $\sin \omega t$ are applied to the ferromagnetic magnetic sensors 12, 13, respectively, is mentioned in the above, the arrangement to input $\sin \omega t$, $\cos \omega t$ to the same, respectively, is also possible.

According to the present invention as described so far, an apparatus for detecting an angle of rotation has been constructed of a rotary magnet having four poles, two ferromagnetic magnetic sensors disposed over the periphery of the rotary magnet so as to face the magnetic poles of the rotary magnet and to have a phase difference of $3\pi/8$ therebetween, a signal generating portion for providing the ferromagnetic magnetic sensors with first and second sine-wave signals provided with an electrical phase difference of $\pi/2$ therebetween, respectively, a synthesizing portion for synthesizing signals output from both of the first ferromagnetic magnetic sensor and the second ferromagnetic magnetic sensor thereby to output a synthesized signal which has the phase difference corresponding to the angle of rotation $\theta$ from the first sine-wave signal, and a rotational angle detecting portion for counting clock pulses during the period of time corresponding to the phase difference thereby to detect the angle of rotation. And therefore, the resolving power can be improved only by increasing the frequency of the clock pulse, and yet, a single power source of $+V_{cc}$ is only required as the power source. Further, while the magnetoresistive element constant $\alpha$ has a temperature coefficient, and therefore, the amplitude of the synthesized output $V_c$ varies depending on the temperature, since the threshold level of waveform shapers is set at the middle point of the amplitude of the synthesized output $V_c$, namely, at $V_{cc}/2$, the shaped-waveform output does not vary with variations in the amplitude of $V_c$ depending on the temperature. Thus, it is made possible to make a detection of an angle with high precision unaffected by the temperature.

What is claimed is:

1. An apparatus for detecting an angle of rotation comprising:
   a rotary magnet having a circumference in a plane of rotation on which four magnetic poles are spaced apart from each other at equal angular intervals;
   first and second magnetic sensors of a ferromagnetic material disposed adjacent and facing toward the circumference of the rotary magnet spaced apart from each other at an angular interval of $(2n+1)\pi/8$, where n is an integer;
   a signal generating circuit connected to said first and second sensors for applying first and second sine wave signals thereto, respectively, which have a phase difference of $\pi/2$ in electrical angle between them;
   a synthesizing circuit receiving respective signals output from said first and second sensors, as a result of said applied first and second sine wave signals and rotation of said rotary magnet through an angle $\theta$ past said first and second sensors, for generating a synthesized signal based upon said received signals having a phase difference from the phase of said first sine wave signal corresponding to said angle $\theta$ of rotation; and
   a rotation angle detecting circuit receiving the synthesized signal output from said synthesizing circuit and receiving said first sine wave signal from said signal generating circuit for generating an output representing the angle of rotation based on said phase difference.

2. An apparatus for detecting an angle of rotation according to claim 1, wherein said synthesizing circuit is adapted such that the midpoint potential of the synthesized signal and the midpoint potential of the first sine-wave signal are maintained on the same level, and wherein said rotational angle detecting circuit includes waveform shapers for slicing said synthesized signal and said first sine-wave signal at the midpoint potential and means in response to the outputs from said waveform shapers for detecting the phase difference thereby to detect the angle of rotation based on said phase difference.

3. An apparatus for detecting an angle of rotation according to claim 2, wherein said means for detecting the phase difference detects the phase difference by counting clock pulses during the period of time correspoonding to the phase difference.

* * * * *